US008600789B1

(12) United States Patent
Frew et al.

(10) Patent No.: US 8,600,789 B1
(45) Date of Patent: Dec. 3, 2013

(54) SYSTEM AND METHOD FOR PROCESSING OFFENDING ITEMS IN A FINANCIAL SYSTEM

(75) Inventors: David Todd Frew, Fort Mill, SC (US); Gregory Clarence Brown, Tampa, FL (US); Melinda Karen Petty, Ennis, TX (US); George Miller Abernethy, Charlotte, NC (US); Leslie Marie Doby, Matthews, NC (US); Pamela Rowland, Huntersville, NC (US); Zhongmin Agarwal, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 619 days.

(21) Appl. No.: 12/362,833

(22) Filed: Jan. 30, 2009

Related U.S. Application Data

(63) Continuation-in-part of application No. 11/555,444, filed on Nov. 1, 2006.

(51) Int. Cl.
*G06Q 10/00* (2012.01)
*G06Q 40/00* (2012.01)

(52) U.S. Cl.
USPC .............................................. 705/7; 705/45

(58) Field of Classification Search
USPC ....................................................... 705/7, 45
See application file for complete search history.

(56) References Cited

U.S. PATENT DOCUMENTS

| | | | |
|---|---|---|---|
| 6,295,522 B1 * | 9/2001 | Boesch ........................... | 705/41 |
| 7,003,494 B2 | 2/2006 | Beach et al. | |
| 7,028,886 B1 * | 4/2006 | Maloney ......................... | 235/375 |
| 2002/0194174 A1 | 12/2002 | Calkins et al. | |
| 2002/0198860 A1 * | 12/2002 | Smith .............................. | 707/1 |
| 2003/0172066 A1 * | 9/2003 | Cooper et al. .................... | 707/7 |
| 2004/0107205 A1 * | 6/2004 | Burdick et al. ............... | 707/102 |
| 2005/0108168 A1 * | 5/2005 | Halpin et al. ................... | 705/45 |
| 2006/0229987 A1 | 10/2006 | Leekley | |

OTHER PUBLICATIONS

Snow, Bonnie; "Trade Names in Medicine: Searching for Brand Name Comparisons and New Product News"; Database; Jun. 1992.*
Wolff, Thomas E. "Personal Bibliographic Databases: An Industrial Scientist's Perspective"; Database; Apr. 1992.*
International Search Report and Written Opinion for International Application No. PCT/US07/83314, mailed Sep. 23, 2008, 8 pages.

(Continued)

*Primary Examiner* — Edward Chang
(74) *Attorney, Agent, or Firm* — Banner & Witcoff, Ltd.; Michael A. Springs (57) ABSTRACT

An offending item detection system is provided for analyzing and processing documents received at one or more capture sites. A physical document may be electronically captured at a capture site and subsequently transmitted to a regional or central processing system. The processing system may then analyze the captured documents to identify and flag suspected offending items such as duplicates. Suspected offending items may be removed from a processing stream and replaced by a substitute transaction to keep the financial system in balance and to reduce potential for processing backlog. In the meantime, the suspected offending item may be analyzed. If the item is a false positive, the substitute transaction may be canceled and the financial document reinserted into the processing stream. If the suspected item is a true offending item, the substitute transaction may be replaced by or converted into another transaction funded by a general suspense account.

24 Claims, 9 Drawing Sheets

(56) References Cited

OTHER PUBLICATIONS

International Preliminary Report on Patentability for International Application No. PCT/US2007/083314, issued May 5, 2009, 5 pages.
Final Office Action for Application No. 11/555,444 mailed Aug. 31, 2010, 20 pages.
Non-Final office action for related application No. 11/555,444 mailed Mar. 30, 2011.
Final office action for related U.S. Appl. No. 11/555,444 mailed Sep. 26, 2011.
Non-Final Office Action for related U.S. Appl. No. 11/555,444 mailed Jul. 16, 2013.

* cited by examiner

SYSTEM AND METHOD FOR PROCESSING OFFENDING ITEMS IN A FINANCIAL SYSTEM

CROSS-REFERENCE TO RELATED APPLICATIONS

The present application is a continuation-in-part of and claims the benefit of priority from U.S. application Ser. No. 11/555,444, filed Nov. 1, 2006 and entitled "SYSTEM AND METHOD FOR DUPLICATE DETECTION," the content of which is incorporated herein in its entirety.

BACKGROUND

The efficiency and speed with which financial processes are performed often have substantial impact on a company's operating costs and profits. Customers may also be drawn to financial companies that are able to perform transactions more expediently than others. For example, the speed with which checks are deposited and reflected in a customer's account may affect a customer's satisfaction with the financial institution. More efficient processing of financial transactions may further prevent financial irregularities in the bank's accounting ledger and/or transaction log.

One area in which financial institutions may encounter operational delays is duplicate detection and processing. With the advent of electronic banking and electronic processing of financial transactions, duplicate detection is often needed to prevent double processing of the same financial document (e.g., negotiable instrument) or transaction. However, current electronic duplicate detection systems may be over inclusive and flag non-duplicate documents as duplicate items. For example, rebate checks having the same check number and deposited by multiple customers of the same banking institution may be flagged as a duplicate document or item. In another example, a returned check may also be erroneously labeled as a duplicate item based on the same micr line information and/or check number. As such, false-positives may create significant delays in the processing of various transactions.

Additionally, current financial transactions are generally processed locally at each banking site (e.g., local bank branch, automated teller machine (ATM)). Thus, when the local banking site closes, the processing of financial transactions is also generally shut down for the day. This produces significant delays in the completion of transactions that are not entered in time to be processed the same day. Further, since financial documents are processed locally, duplicates submitted at different bank branches or sites often go undetected.

SUMMARY

This summary is provided to introduce a selection of concepts in a simplified form that are further described below in the Detailed Description. The Summary is not intended to identify key features or essential features of the claimed subject matter, nor is it intended to be used to limit the scope of the claimed subject matter.

A regional or central duplicate detection system allows local capture sites such as local branches and ATMs to submit captured documents for review and processing. For example, a check deposited at a local ATM may be scanned into electronic format and forwarded to a regional processing center. By processing documents regionally, the scope of duplicate detection is expanded and consequently, the accuracy of duplicate detection may also be enhanced. A reformatter system at the regional processing center may initially determine whether the check should be flagged as a false-positive. This determination may be made based on predefined rules and preferences. If the check constitutes a false-positive, the check may be flagged and forwarded to a duplicate detection system. Flagging potential false-positive documents may reduce the over inclusiveness of duplicate detection systems. The duplicate detection system may then evaluate the check to determine whether or not the check is a duplicate. If the check is flagged as a false-positive, the duplicate detection system may then apply different duplicate detection rules than if the check were not flagged. Duplicates and non-duplicates may subsequently be transferred back to the reformatter system. The non-duplicates may be released for posting or dispatching while the duplicates may be submitted to a manual review system. For example, partner non-duplicate documents may be dispatched as an image cash letter to the responsible financial institution while on-us non-duplicate documents (i.e., documents or instruments that are charged against the processing financial institution) may be posted for internal reconciliation and processing.

In one or more aspects, suspected duplicate documents identified by the duplicate detection system may be forwarded by the reformatter system to a review system. The review system may distribute suspected duplicates to one or more workstations. Personnel at the workstations may then manually review the suspected duplicate item and the alleged original item to determine whether or not the suspect duplicate is a true duplicate or a false positive. If the suspect duplicate is a true duplicate, the duplicate may be charged to a general ledger suspense account and further evaluated by a research and adjustments department. If, however, the suspect duplicate is a false-positive, the suspect duplicate may be flagged appropriately and re-processed.

According to another aspect, multiple false-positive flags may be defined corresponding to different levels of evaluation of the duplicate detection system. That is, a first false-positive flag may instruct the duplicate detection system to identify a flagged false-positive as a duplicate if the document includes the same micr line as another document. A second false-positive flag, however, may indicate to the duplicate detection system that a document flagged with the second false-positive flag is not a duplicate, even if the item sequence number matches that of another document.

According to yet another aspect, a regional processing system may separate out suspected duplicates and non-duplicates so that non-duplicates may be processed, dispatched, and/or posted without having to wait for resolution of the suspected duplicates. In addition, regional processing allows financial transactions to be processed independent of a local capture site's hours of operation. As such, even when a local capture site (e.g., a local bank branch) has closed, the transaction documents captured at the site may still be processed.

According to another aspect, suspected duplicate items may be removed from a processing stream and replaced by a substitute transaction. The substitute transaction may be created in a work-in-progress ledger of a financial institution processing the suspected duplicate items. The substitute transaction may be a temporary way to keep the system in balance while the suspected duplicate items are resolved. If a suspected duplicate item is determined to be a false positive duplicate, the suspected duplicate item may be reinserted into the processing stream and the substitute transaction canceled. Alternatively, if the suspected duplicate item is determined to be a true duplicate, the work-in-progress ledger may be converted into a second type of transaction that is charged against a general suspense account.

According to yet another aspect, the process of identifying and processing suspected duplicate items may be applied to other types of offending documents that may need to be separately processed. For example, a check may include an incorrect account number or have bad image quality. In such cases, the check or other document with the identified issue may be extracted from the processing stream and replaced by a substitute transaction until the issue with the item is resolved.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

Figure 1:
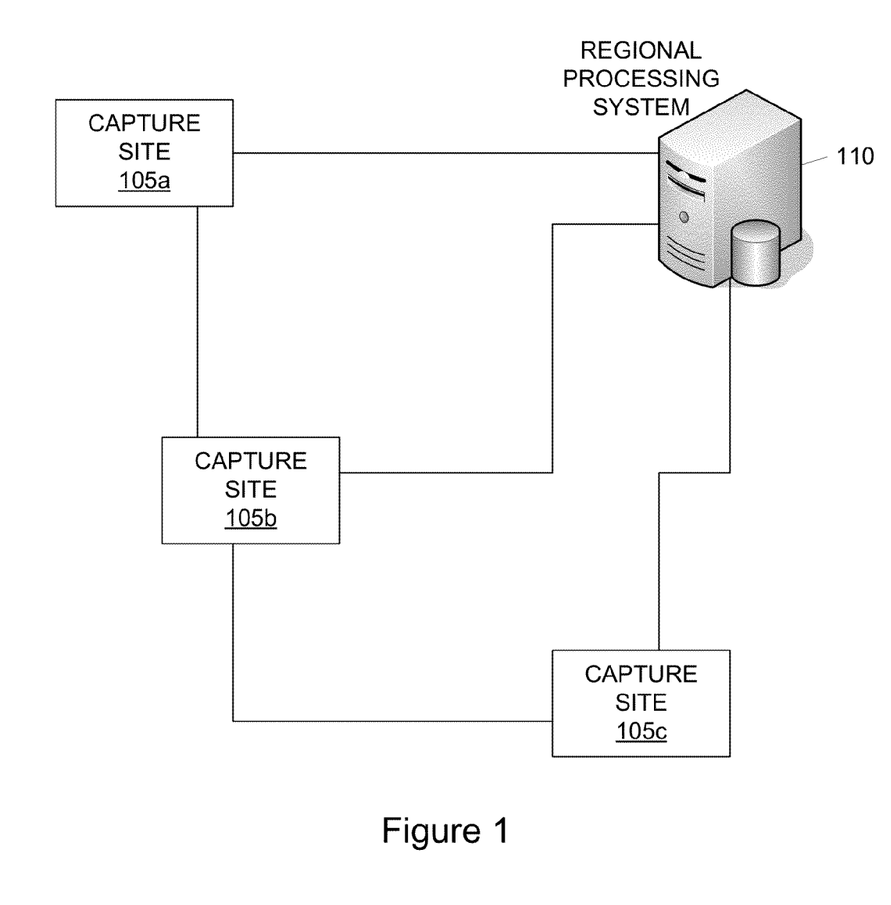
FIG. 1 illustrates a document processing and review system according to one or more aspects described herein.

FIG. 1 illustrates a document processing and review system including multiple document capture sites 105 and duplicate detection server 110. Duplicate detection server 110 is connected to each of document capture sites 105a, 105b and 105c such that documents captured at sites 105 may be transmitted to and processed by a central system. In the banking industry, for example, duplicate detection may be performed for documents like deposit and withdrawal slips, checks and fund transfer documents so that the same documents are not processed twice. In addition, by using a central detection server such as server 110, duplicates may be detected across multiple capture sites, e.g., 105a and 105b. In one or more configurations, each of document capture sites 105a, 105b and 105c may be remotely located from one another. In addition, detection server 110 may also be remotely located from each of capture sites 105a, 105 and 105c. To facilitate communications such as the transfer of digital documents, the sites 105a, 105b and 105c may each be connected to duplicate detection server 100 through a wired or wireless network. Various networking protocols that may be used to facilitate such a system may include local area networks (LANs), wireless local area networks (WLANs), cellular networks and/or combinations thereof. Encryption such as SSL and the like may also be used to enhance the data transfer security of documents like financial transaction records, receipts and ledgers.

Document capture sites 105 may include various facilities and systems including local bank branches, automated teller machines (ATMs), and local capturing and/or processing sites. In one example, a check deposited by a bank customer at his or her local branch may be scanned by a document scanning system or device at the local branch. The scanned image of the document may undergo further processing within the local branch (e.g., adding to a transaction log, sorting, etc.) and/or may be routed to another facility like detection server 110 for processing. In one or more configurations, a local capture site such as capture site 105b, may further be connected to an intermediate facility or site (not shown). The intermediate facility or system may be used to perform various processes on documents captured by site 105b prior to transmitting the document to detection server 110. Captures sites 105 may also be connected to one another allowing each site 105a, 105b and 105c to communicate with each other. For example, if a problem arises in the connection between site 105a and server 110, site 105a may still communicate documents or other information to server 110 through site 105b or 105c.

Duplicate detection server 110 is configured to perform duplicate detection on documents captured by multiple capture sites 105. Capture sites 105 may be sites located within a particular region. As such, duplicate detection server 110 may be responsible for a particular region of capture sites while other detection servers (not shown) may be used by other regions. Regions may be defined based on a variety of factors, including physical location, processing load and/or hours of operation. For example, capture sites 105 may be divided into regions in a manner that evenly distributes the processing load among multiple detection servers. Connections between sites 105 and server 110 may further support two-way communications so that server 110 may provide data to sites 105.

Figure 2:
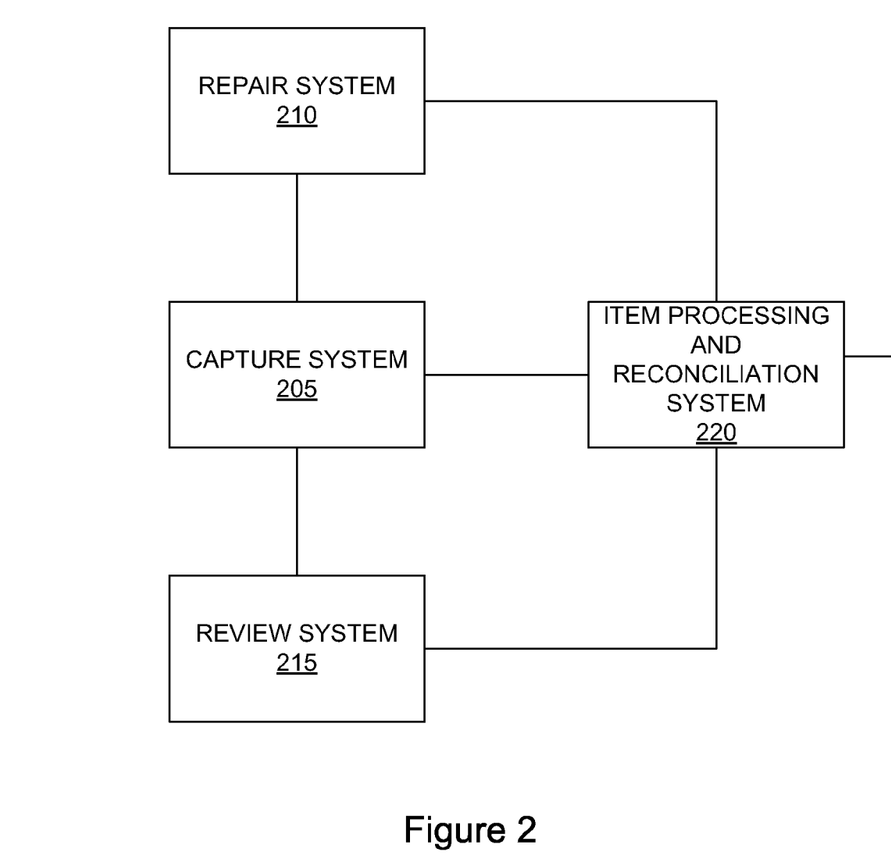
FIG. 2 illustrates a block diagram of systems and components of a capture site according to one or more aspects described herein.

FIG. 2 illustrates a block diagram of systems and components of a capture site such as site 105a of FIG. 1. The systems and components of the capture may include document capture system 205 that is configured to convert physical documents into electronic document images. For example, document capture system 205 may include a scanner whereby the image of a physical document may be captured electronically. Document capture system 205 may further include character or pattern recognition functionality so that captured documents may be categorized and/or otherwise processed based on content. Capture system 205 may also index the captured document by assigning each document with an identification number or mark.

The capture site may also include document or image repair system 210, document review system 215 and an item processing and reconciliation system 220. Repair system 210 may be used to repair documents that cannot be processed due to various reasons including poor image capture quality and invalid or unrecognized document types. Repair system 210 may repair documents automatically by, e.g., improving image quality using image processing techniques. Repair system 210 may also forward rejected documents to a user for manual review and repair. In one or more configurations, rejected or questionable documents may be submitted to document review system 215 where a user may manually review and analyze the rejected 1 document. For example, document review system 215 may include a server that distributes rejected documents to one or more workstations where review personnel are stationed. Each of capture system 205, repair system 210 and document review system 215 is further connected to item processing and reconciliation system 220 which is configured to collect documents captured through the capture site, process the document according to one or more predefined tasks and to reconcile information contained within the captured documents. For example, documents received through the capture site may be parsed for information such as whether or not the document reflects a deposit or a withdrawal and an amount associated therewith. Accordingly, item processing and reconciliation system 220 may insure that deposits and withdrawals are reconciled in a ledger or other transaction log for the capture site. Processing and reconciliation system 220 may also prepare documents to be transmitted to a regional processing site such as duplicate detection server 110 of FIG. 1. In one example, documents may be converted to a uniform format and/or combined into a single file for transmission.

Figure 3:
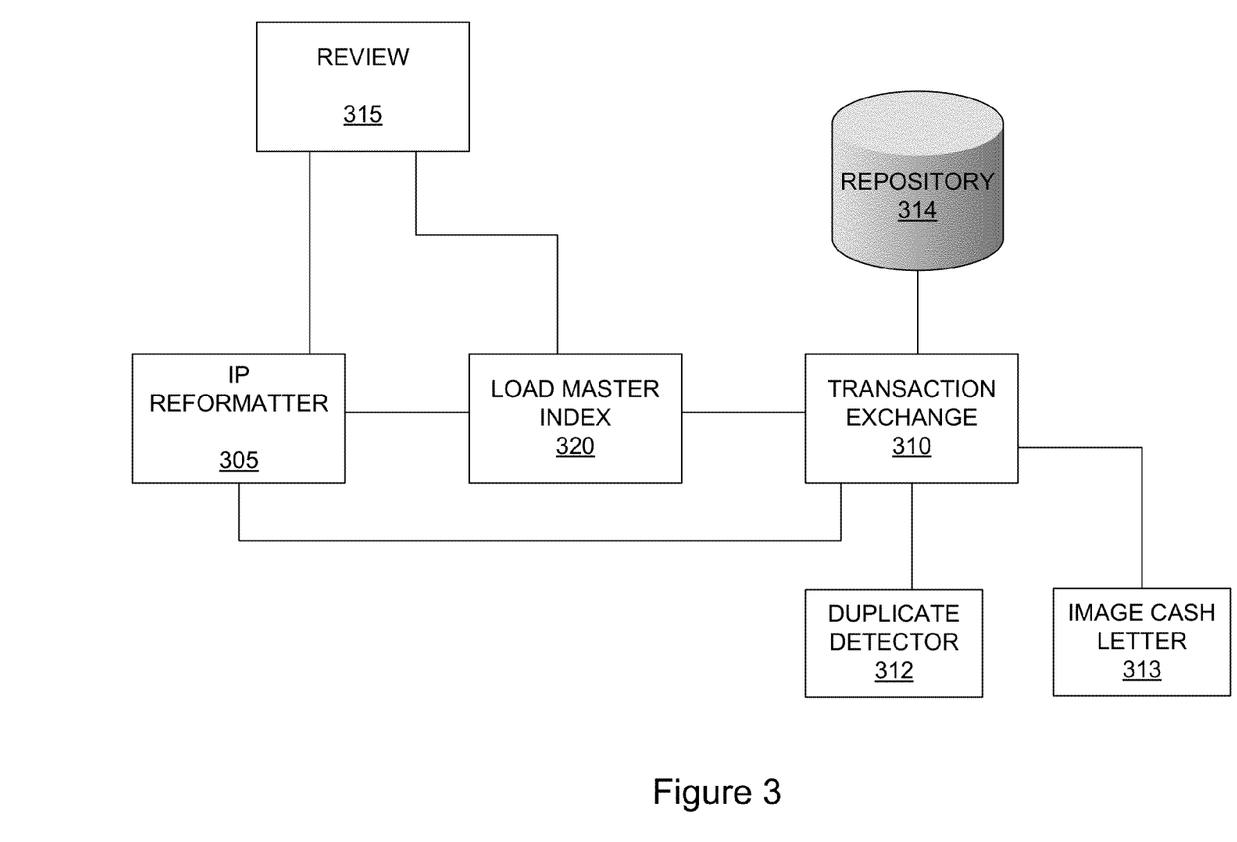
FIG. 3 illustrates a block diagram of systems and components of a regional document processing system according to one or more aspects described herein.

Documents captured and processed by a capture site are subsequently transmitted to a regional or central duplicate detection and processing server. FIG. 3 illustrates a block diagram of systems and components of a duplicate detection and processing server (e.g., duplicate detection server 110 of FIG. 1). The duplicate detection server may include systems such as Item Processing (IP) reformatter system 305, transaction exchange system 310, review system 315 and master index system 320. Transaction exchange system 310 may include a transaction duplicate detector subsystem 312 and an image cash letter subsystem 313. Initially, IP reformatter system 305 may receive a collection of document images from one or more capture sites like sites 105 (FIG. 1). Upon receipt of the document images, reformatter 305 may be configured to reformat the documents into a format specified by transaction exchange system 310. In addition, IP reformatter 305 may analyze each document to determine whether the document is a false-positive duplicate. In other words, transaction duplicate detector 312 may identify the document as a duplicate when the document is actually not a duplicate. False-positives may occur in a variety of instances including when an item (e.g., a check) is returned or when rebate checks are deposited (rebate checks may have the same check number). False-positives may also include re-clears and casino drafts. IP reformatter system 305 may be configured with rule that define conditions under which a document is to be flagged a false-positive duplicate.

Generally, IP reformatter 305 is connected to load master index system 320 which is configured to index documents passed from IP reformatter 305 to transaction exchange system 310. The index may be used to identify documents that are dispatched to other banks or companies through image cash letter subsystem 313. Once indexed, documents are then deposited in transaction exchange system 310 for collection and storage. Transaction exchange system 310 includes master repository 314 for storage of all document images that are sent to the regional or central duplicate detection server. In addition, transaction exchange system 310 is responsible for passing the documents to duplicate detection subsystem 312 and, if the documents have been cleared for dispatch, to image cash letter subsystem 313 or a posting system (not shown). According to one or more aspects, documents may be classified into partner items and on-us items for processing purposes. Partner items may refer to documents that are to be submitted to another bank or company for resolution (e.g., a check drawn on another bank). On-us items, on the other hand, generally relate to documents that are to be reconciled internally (e.g., withdrawal slips and line of credit documents). Additionally, duplicate detection subsystem 312 is connected to IP reformatter system 305 for further processing of detected duplicates.

IP reformatter system 305 may also be connected to duplicate review system 315, which facilitates the review and analysis of detected duplicates. Duplicate review system 315 may include a distribution server (not shown) that takes individual suspected duplicate documents and distributes them to one or more workstations. Review personnel at the workstations may then review the suspected duplicate documents and manually determine whether or not the documents are true duplicates or false-positives. In one or more configurations, review personnel may review and analyze suspect documents in electronic format rather than having to retrieve and evaluate paper copies. This may increase the speed and efficiency and reduce the cost of manual duplicate review processes.

Figure 4:
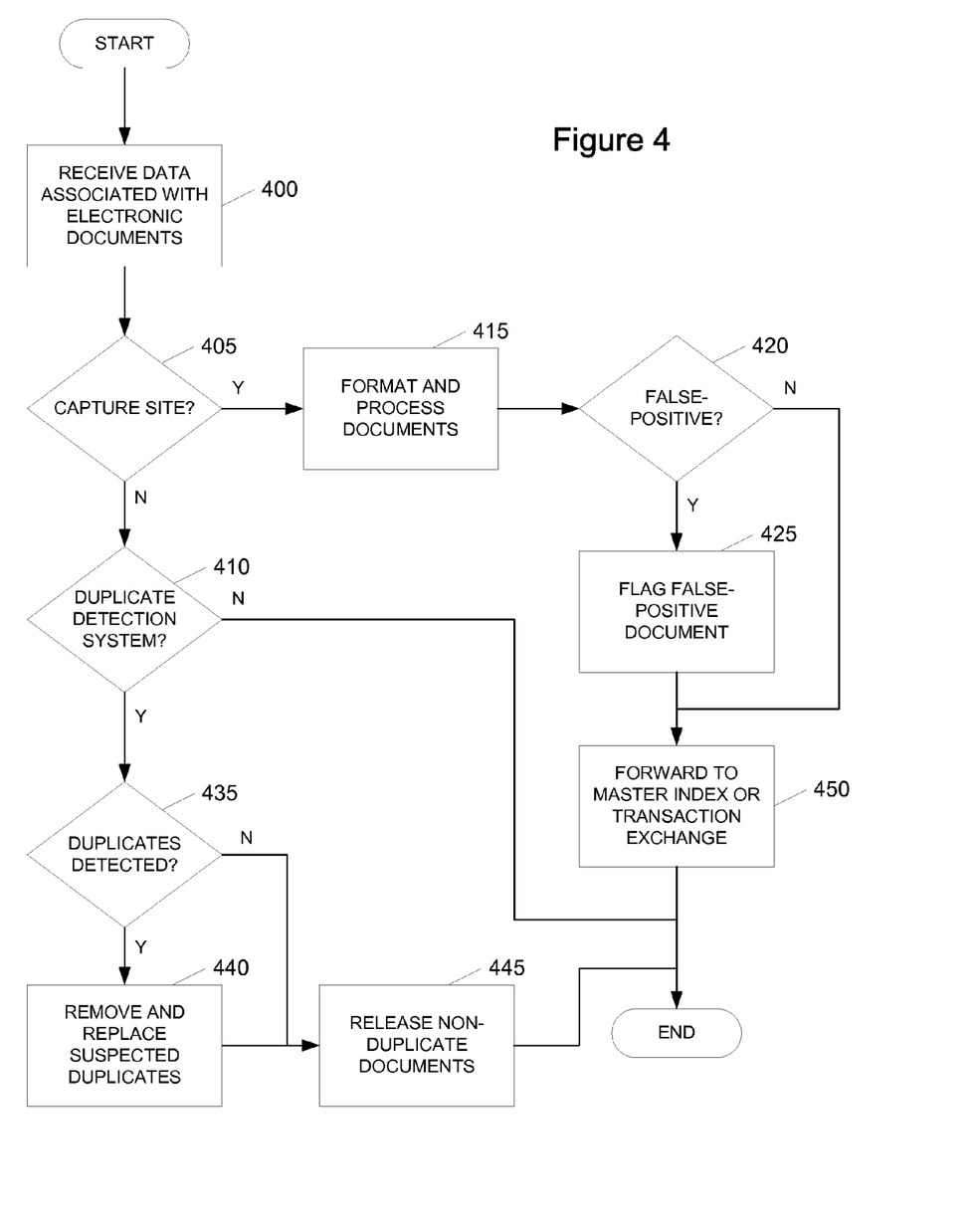
FIG. 4 is a flowchart illustrating a method for analyzing and processing received documents by a reformatter system according to one or more aspects described herein.

FIG. 4 is a flowchart illustrating a method for analyzing and processing documents received from capture sites. In step 400, a system such as reformatter 305 of FIG. 3 may receive a data associated with one or more electronic documents. The data may be received in the form of a single data file or separate files. In steps 405 and 410, the system determines whether the data corresponding to the one or more electronic documents was received from a capture site or from a duplicate detection system, respectively. If it is determined in step 405 that the electronic documents were received from a capture site, the system may format and process each document in step 415. Processing and formatting may include reformatting the document into a specified format and/or performing character and pattern recognition. In step 420, the system may determine whether or not a document is a false-positive. The determination may include identifying whether a document includes predefined characteristics associated with false-positive duplicates. For example, a rule may be defined in the system that associates a document having the word "Rebate" with a false-positive. In another example, documents that are identified as returned checks may automatically be flagged as false-positives.

In step 425, each document identified as a false positive may be flagged as such. False-positive flags may determine a manner in which the document is processed by a duplicate detection system. As such, different false-positive flags may be applied depending on the predefined rules. A rebate check may be flagged with a false-positive value of '3' that would cause the rebate check to be flagged as a duplicate only if the item sequence number of the check and a second document are the same. Other false-positive flags may be defined such that a document is flagged as a duplicate if the micr line of the document is the same as another document, if the document has the same date or if the document has the same date and sequence number. A micr line may include a serial number, routing transit number, account number, and/or dollar amount. In one or more arrangements, a false-positive flag may also be defined for flagging documents that are not to be treated as duplicates even if the item sequence numbers are the same. Sequence numbers may be used to identify an order in which documents and items are captured. One of skill in the art will appreciate that different and additional flags may be defined for various other conditions. Once the documents received from the capture site have been processed, the documents may then be forwarded to a master index system and/or to a transaction exchange system where duplicates are detected in step 450.

If, however, it is determined in steps 405 and 410 that the data corresponding to the electronic documents were received from the transaction exchange system and not a capture site, the system may determine whether duplicates were detected in the documents in step 435. If duplicates were detected, the suspected duplicates may be removed from the data file and replaced with substitute documents in step 440. Substitute documents are generally used to balance and reconcile the processing system. For example, substitute documents may be used so that it does not appear as if one or more documents were lost during the processing. The appearance of lost documents may cause irreconcilable errors in the bank's general ledger and/or transaction logs. The substitute documents may, in one or more arrangements, include information indicating that the original document is undergoing further examination and review. Furthermore, different substitute documents may be used to identify suspected duplicate partner documents versus suspected duplicate on-us documents. Once the suspected duplicates have been removed and replaced in step 440, the system may release the data associated with the one or more non-duplicate documents for posting internally or dispatching to external entities in step 445. That is, on-us items may be posted to internal processing and accounting systems while partner items may be transmitted to the responsible entities (e.g., another bank). If, however, in step 435, the system determines that no suspected duplicates were detected in the documents, the data may be released in step 445 without having to remove detected duplicates and insert substitute documents. As such, non-duplicate documents may be processed and released while suspected duplicates undergo further analysis and review.

Suspected duplicates removed in step 440, on the other hand, may be transmitted to a review system for manual reviewing and processing by personnel. In particular, a suspected duplicate and the corresponding alleged original may be transmitted to one or more workstations in electronic format for review. Prior to forwarding the suspected duplicate documents for manual review, the system may, in some instances, reformat the documents into a viewing format compatible with one or more applications used in the manual review process.

Figure 5:
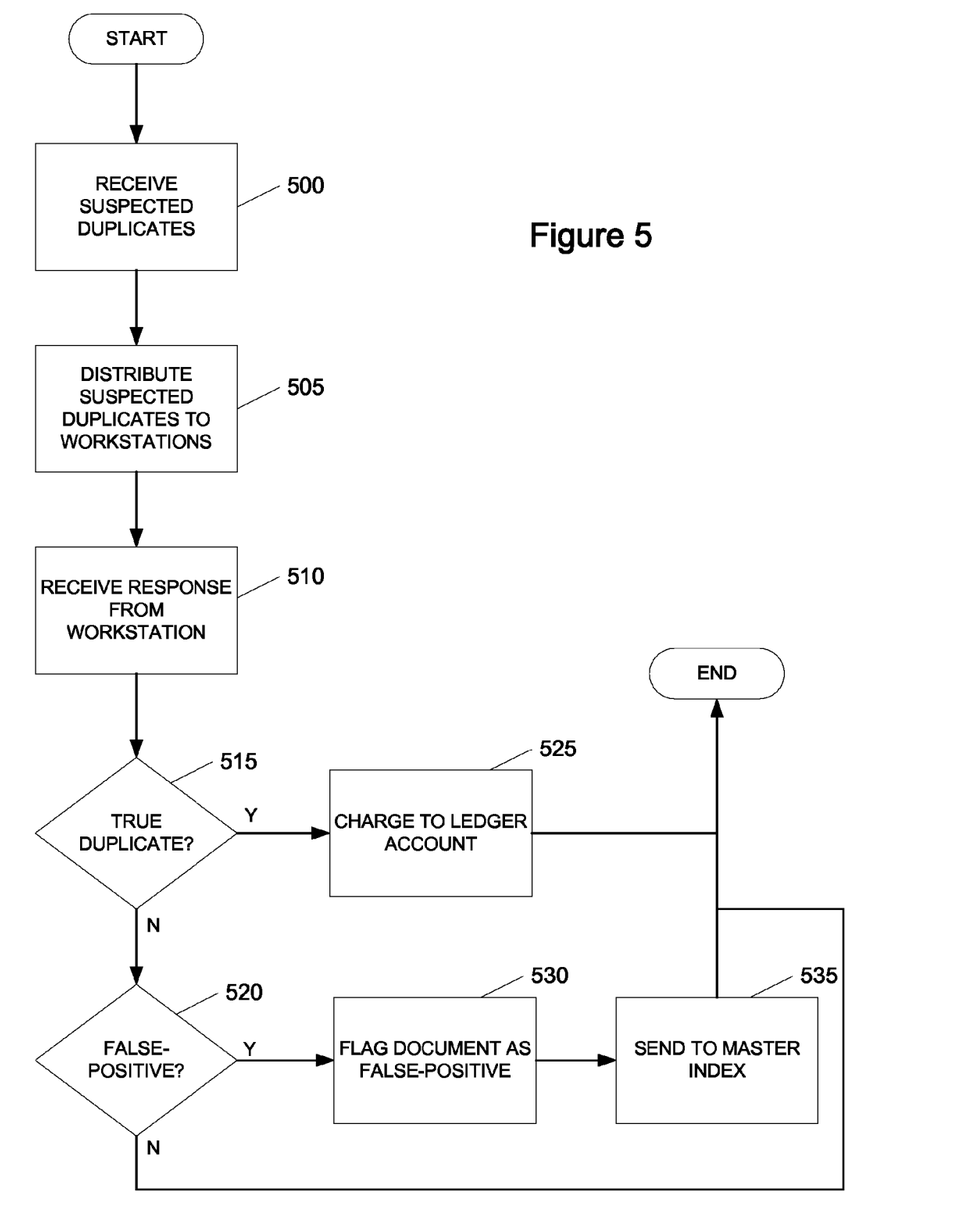
FIG. 5 is a flowchart illustrating a method for evaluating and processing suspected duplicate documents according to one or more aspects described herein.

FIG. 5 is a flowchart illustrating a process for evaluating and processing suspected duplicate documents. In step 500, a duplicate review system may receive one or more suspected duplicates. The suspected duplicates may be received as a single data file or as multiple individual document files. Upon receipt of the suspected duplicates, the system may distribute the duplicate documents to one or more workstations in step 505. The duplicates may be distributed based on a load balancing scheme whereby workstations with low review queues are assigned duplicates ahead of workstations with higher review queues. In step 510, the system may receive a response from a workstation regarding a suspected duplicate. A determination may be made as to whether the response corresponds to a true duplicate determination or a false-positive determination in steps 515 and 520, respectively. If the suspected duplicate is a true duplicate, the suspected duplicate document may be charged to a general ledger suspense account in step 525. A suspense account provides temporary holding of suspected duplicates while they are being resolved. If, on the other hand, the suspected duplicate document is a false-positive, the system may flag or otherwise modify the document so that the document is dispatched or posted in step 530. For example, the system may flag the document as a false-positive allowing the document to bypass the duplicate detector and proceed to posting or dispatching depending on the type of document. Once flagged, the document may then be sent to a master index system for re-processing in step 535.

Figure 6:
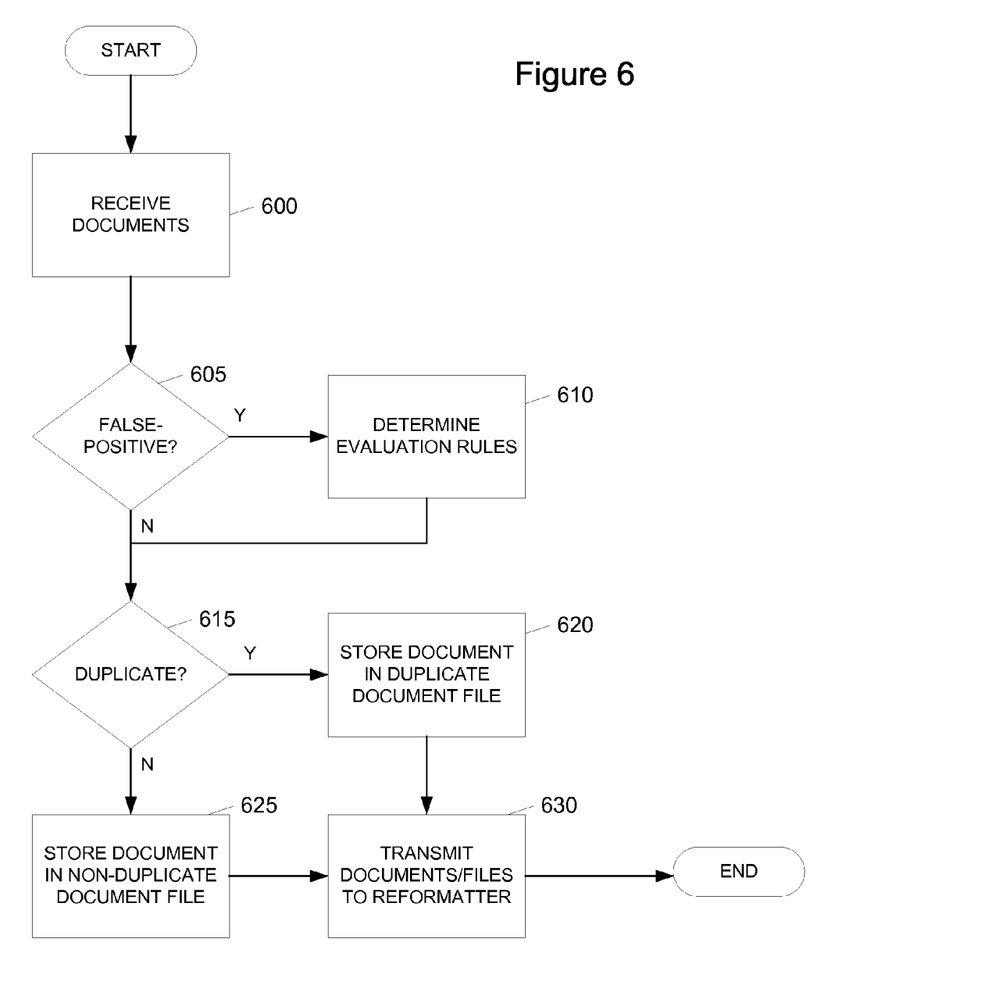
FIG. 6 is a flowchart illustrating a method for identifying duplicates in a set of documents according to one or more aspects described herein.

FIG. 6 illustrates a method for detecting duplicate documents and processing both duplicate and non-duplicate documents. In step 600, a duplicate detection system may receive documents from a reformatter system or an intermediary system. Upon receipt, the system may determine whether the received document is flagged as a false-positive in step 605. If the received document is not flagged as a false-positive, a determination may be made as to whether the received document constitutes a duplicate based on documents stored in the system in step 615. For example, the system may make the determination by comparing a variety of information including item sequence numbers, micr line data, date information, payee/payor information and account information. If, on the other hand, the received document is flagged as a false-positive, the system may determine one or more rules or manners for evaluating whether the document is a duplicate in step 610. For example, a rule may specify that documents marked with a particular false-positive flag should not be treated as duplicates even if an item sequence number matches that of another document. In some instances, a false-positive flag may allow a document to bypass the duplicate detection process. These rules may be applied in determining whether the received document constitutes a duplicate in step 615. By comparing a received document with a repository of documents, a duplicate detection system not only determines duplicates based on documents captured from the same capture site, but also based on documents captured or received from other capture sites and entities. As such, the scope of duplicate detection is expanded.

If a duplicate is detected in step 615, the suspected duplicate document may be stored in a duplicate document file in step 620. Additionally, the alleged original document may be stored in association with the suspected duplicate document or may otherwise be identified in the duplicate document file. If, however, a received document is determined not to be a duplicate, the document may be stored in a non-duplicates file in step 625. The process corresponding to steps 605-625 may be repeated for each document received from the reformatter system. In one or more arrangements, suspected duplicates and non-duplicates may be stored in the same file provided that the suspected duplicates are marked or flagged to differentiate them from the non-duplicates. Once the documents received from the reformatter system have been processed, the duplicates and non-duplicates may then be transmitted to a reformatter system in step 630 for further processing as described herein.

Alternatively or additionally, if no duplicates are detected in a set of documents received from the reformatter system, a transaction exchange system performing the duplicate detection may release the documents for posting and dispatching. For example, a set of documents containing no duplicates may be dispatched to an image cash letter system for preparation and transmission to a responsible entity.

While aspects described herein relate to the collection and processing of documents received from capture sites, documents may also be received at a duplicate detection system from other banking or financial entities. That is, checks drawn on Bank A may be deposited at Bank B, scanned into electronic format by Bank B and transmitted to an electronic receiving center of Bank A. Bank A may then forward the received electronic check to a regional or central processing system for duplicate detection and processing. According to one or more aspects, the electronic receiving center may choose a regional processing system for processing the check based on a registered physical address associated with the check.

Additionally, since duplicate document review and other processes are centralized in a regional or central processing system, documents may be processed independently of when a local capture site's (e.g., bank branch or ATM) hours of operation. For example, many current banking institutions only process transactions up until a certain time of day. As such, customers depositing checks or requesting transfers would be required to wait until the next business day for the transaction to be processed. Using a regional processing system may allow transactions to be processed even when the site at which the transaction was entered has closed. Thus, the efficiency with which documents are processed may be increased significantly.

In an alternative or additional embodiment, suspected duplicates may be replaced with placeholder documents (e.g., step 440 of FIG. 4) that are designed to keep the financial system in balance and to reduce the potential for processing bottlenecks. In one example, the placeholder item may provide a value equal to the suspected duplicate. The value may be charged against a work in progress account. A work in progress account may be a temporary ledger that tracks provisional deductions or credits as financial documents are processed through the system. By replacing a suspect document in the processing stream, the processing of other documents in the queue may proceed normally and without delay.

Figure 7:
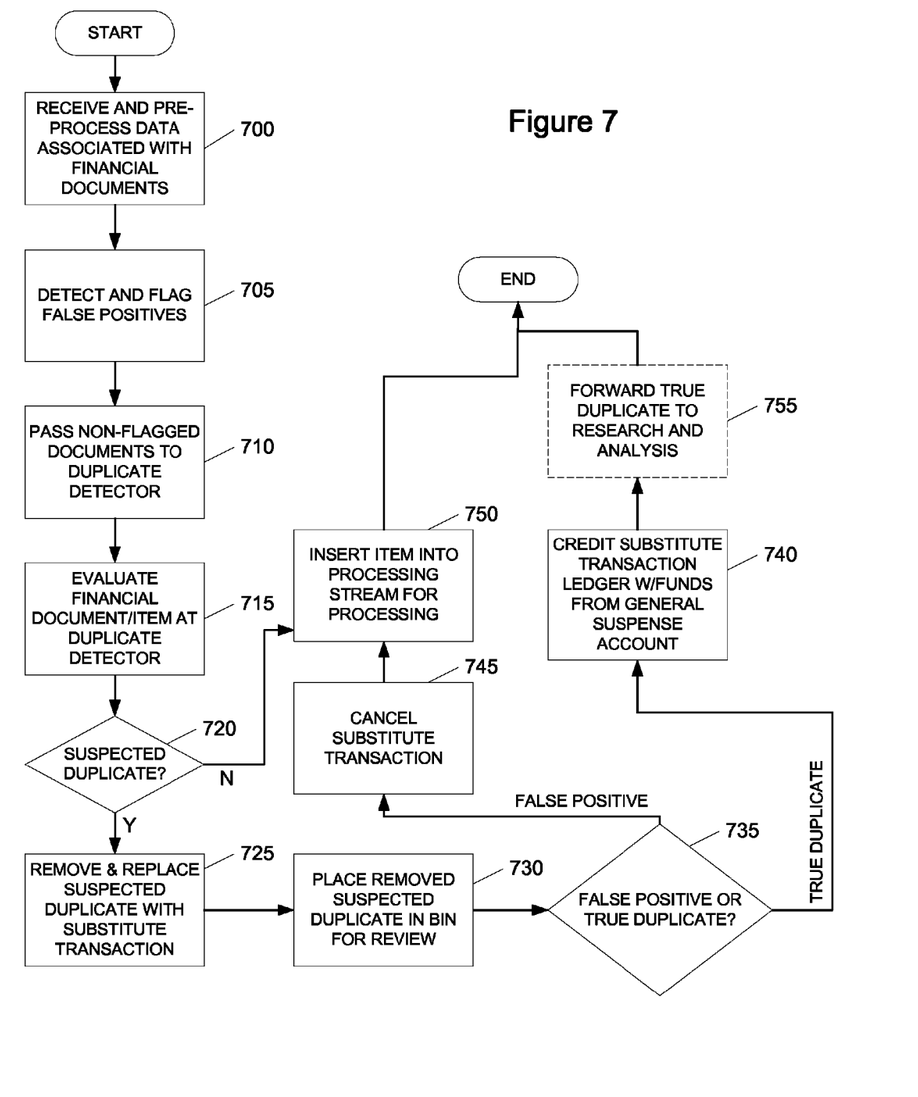
FIG. 7 is a flowchart illustrating an example method for processing suspected duplicate items according to one or more aspects described herein.

FIG. 7 illustrates another example method for duplicate detection in a financial processing system. In steps 700-710, the document processing system may receive and pre-process data associated with financial documents (700), identify and flag false-positives (705) and forward documents not flagged as false-positives to a duplicate detection module (710). Receipt and pre-processing of data associated with financial documents may operate, for instance, as discussed with respect to steps 400-415 of FIG. 4. As noted herein, false-positives may be identified in a variety ways based on pre-defined rules. For example, rebate checks may be automatically flagged as a false-positive duplicate. In another example, returned checks may also be flagged as false-positives. By flagging documents as false-positives, the processing load placed on duplicate detection modules may be decreased and the overall processing efficiency may be increased. Alternatively or additionally, false-positive documents may also be forwarded to the duplicate detection module for duplicate processing.

In step 715 and 720, the duplicate detection module may evaluate each financial item (715) to determine whether the item is a suspected duplicate (720). Duplicate detection may be performed by comparing attributes of a financial item against attributes of other items processed previously. Processed item attributes may, for instance, be stored in a historical database that is examined during duplicate detection. In one example, an item may be identified as a suspected duplicate if a threshold number (e.g., 5, 10, 13, etc.) or percentage (e.g., 65%, 70%, 82%, etc.) of attributes match a previously processed document or item. If an item is determined to be a suspected duplicate, the item may be removed from the processing stream and replaced with a work-in-progress transaction item in step 725. The work-in-progress transaction may reflect a charge against a work-in-progress ledger for a value equal to the value of the suspected duplicate item. For example, if the suspected duplicate item is a check for $100 to be deposited to account XYZ from account ABC, a work-in-progress transaction item may be generated that credits $100 to account XYZ from the work-in-progress ledger (i.e., instead of account XYZ).

The removed suspected duplicate item may be placed in a suspected duplicate file or bin in step 730 for further review. The suspected duplicate item may be stored in association with a transaction identifier corresponding to the substitute work-in-progress transaction. In one or more arrangements, suspected duplicates may undergo manual review to determine whether the suspected duplicate is a true duplicate. Alternatively or additionally, suspected duplicates may be reviewed using automated or semi-automated methods. For example, an image analysis module may compare the appearance of a suspected duplicate with a suspected original (i.e., the document of which the suspected duplicate is suspected to be a duplicate). Image analysis may require more time than can be offered during the initial duplicate check. Including image analysis in an initial duplicate check may create inefficiencies in the financial processing system.

In step 735, a decision may be made as to whether the suspected duplicate is a false-positive or if it is a true duplicate. If the suspected duplicate is determined to be a false-positive, the substitute transaction (i.e., the work-in-progress ledger transaction) may be cancelled and the document is reinserted into the processing stream in steps 745 and 750, respectively. Cancelling the substitute transaction may include removing a credit given to a payee account and removing the transaction entry from the work-in-progress ledger. Alternatively, the work-in-progress ledger transaction may be canceled once the false positive item transaction has been processed. In one example, a rebate check may be identified as a suspected duplicate, a work-in-progress ledger transaction of the same value as the rebate check may be created and inserted into the processing stream. The substitute transaction may credit the value of the rebate to account A from the work-in-progress ledger. Upon determining that the rebate check is not a duplicate, but a false positive, the work-in-progress ledger transaction (and the associated credit) may be removed from the ledger and account A, respectively, once the rebate check is processed (i.e., rebate check is fully processed, providing a credit for the value of the rebate check to account A from the appropriate source/payor).

If, on the other hand, the suspected duplicate is determined to be a true duplicate, the corresponding work-in-progress transaction is credited with the value of the transaction from a general ledger suspense account in step 740. Stated differently, the value of the transaction is debited from the general ledger suspense account. Thus, if a true duplicate is identified, a corresponding work-in-progress transaction may be converted into a general ledger transaction that credits account A from a general ledger suspense account. Optionally, the true duplicate item may be forwarded for further analysis and research to identify a cause or source of the duplicate in step 755. In some arrangements, a true duplicate may be charged back to the depositing customer or may be written off by the financial institution if the value is under a specified threshold (e.g., a research dollar threshold).

Figure 8:
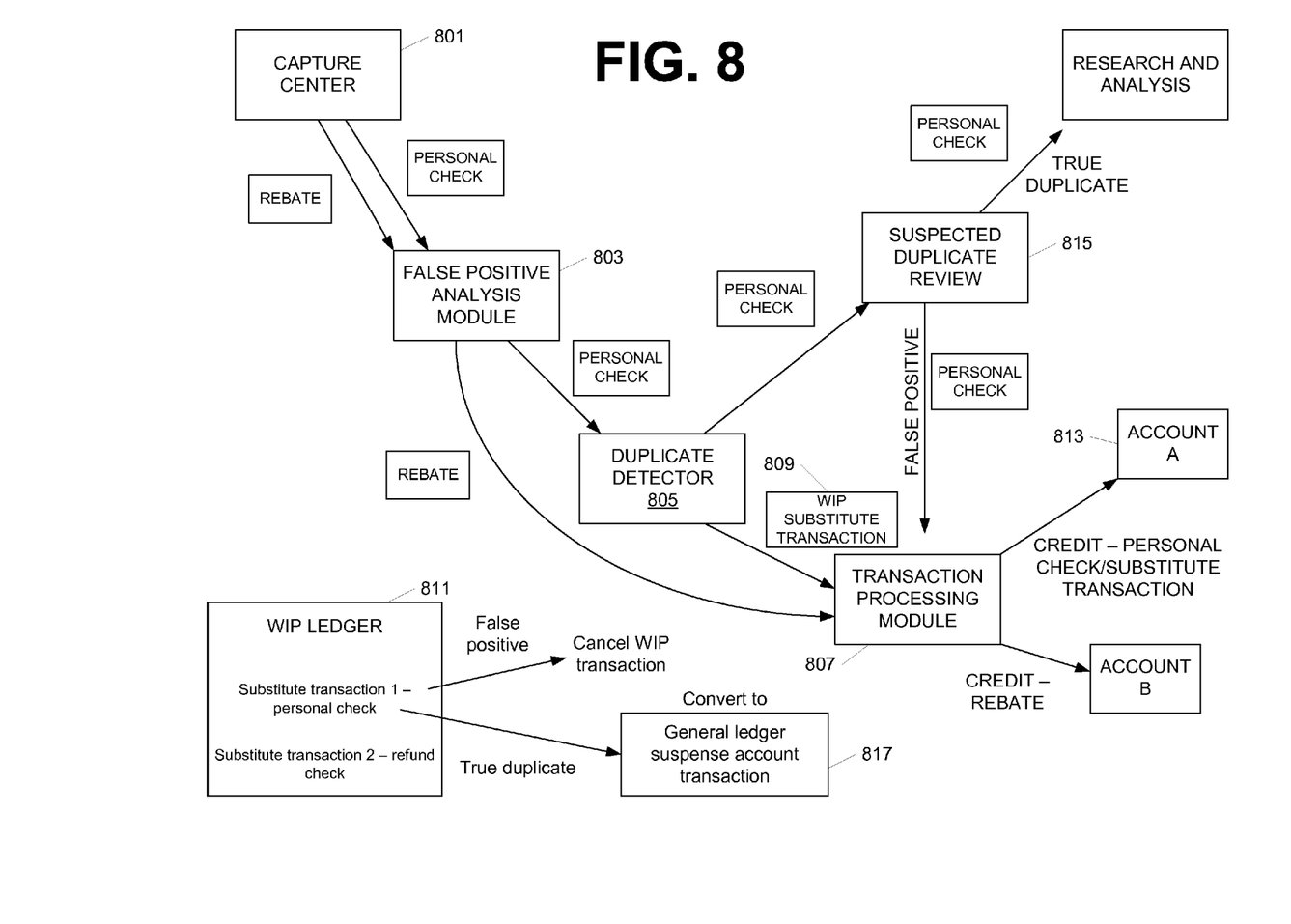
FIG. 8 illustrates an example financial document processing system for resolving suspected duplicate items according to one or more aspects described herein.

FIG. 8 illustrates an example duplicate detection process. Initially, data associated with a personal check and a rebate check may be received by a capture center 801 of financial processing system that is configured to electronically collect financial document data from a variety of locations such as automated teller machines, local branches and the like. The data associated with the personal check and the rebate check may be processed in a variety of ways prior to being sent to a false positive analysis module 803. In the illustrated example, false positive analysis module 803 may determine that the rebate check is a false positive duplicate and flag it as such prior to forwarding the document data to a duplicate detector module 805. Items flagged as false positives such as the rebate check might not be analyzed by the duplicate detector module 805; instead the items may bypass duplicate detection to a financial transaction processing module 807. Transaction processing may include crediting a value to a payee account, generation of image cash letters to a payor institution, reconciliation of accounts within the financial institution (e.g., if the payor and the payee accounts are held by the same financial institution) and the like.

While the rebate check is permitted to bypass the duplicate detector module 805, the personal check may be subject to duplicate analysis. Various rules, as described herein may be applied to make a suspected duplicate determination. If the duplicate detector module 805 determines that the personal check is a suspected duplicate, a work-in-progress transaction 809 may be inserted into the processing stream, replacing the personal check. Additionally, the transaction 809 may be recorded in a work-in-progress ledger 811 and/or a credit for the value of the personal check may be given to a payee account 813. Suspected duplicates may be verified as a non-duplicate (i.e., false positive) or a true duplicate by manual, semi-automatic or fully automatic review processes 815. If the personal check is determined to be a false positive, the check may be reinserted into the payment stream and corresponding transaction 809 removed or cancelled. For example, the transaction 809 may be removed from work-in-process ledger 811 and the credit removed from payee account 813. The personal check may then be processed to provide the credit to payee account 813 from the appropriate source/payor.

If, on the other hand, the personal check is determined to be a true duplicate, the work-in-progress transaction 809 may be converted to a general ledger account transaction 817. For example, a credit may be provided from the general ledger account to a work-in-progress ledger for the amount of the substitute transaction inserted into the payment stream for the personal check. The work-in-progress transaction 809 may then be removed from the system.

The process of detecting a suspected duplicate and replacing the item in the processing stream with a substitute transaction can be applied to other situations and item issues. For example, any offending transaction or item in the processing stream may be identified using specified criteria and replaced by a substitute transaction until the issue has been resolved. Other issues may include an incorrect account number, poor image quality, signature mismatches, suspected falsifications and the like.

Figure 9:
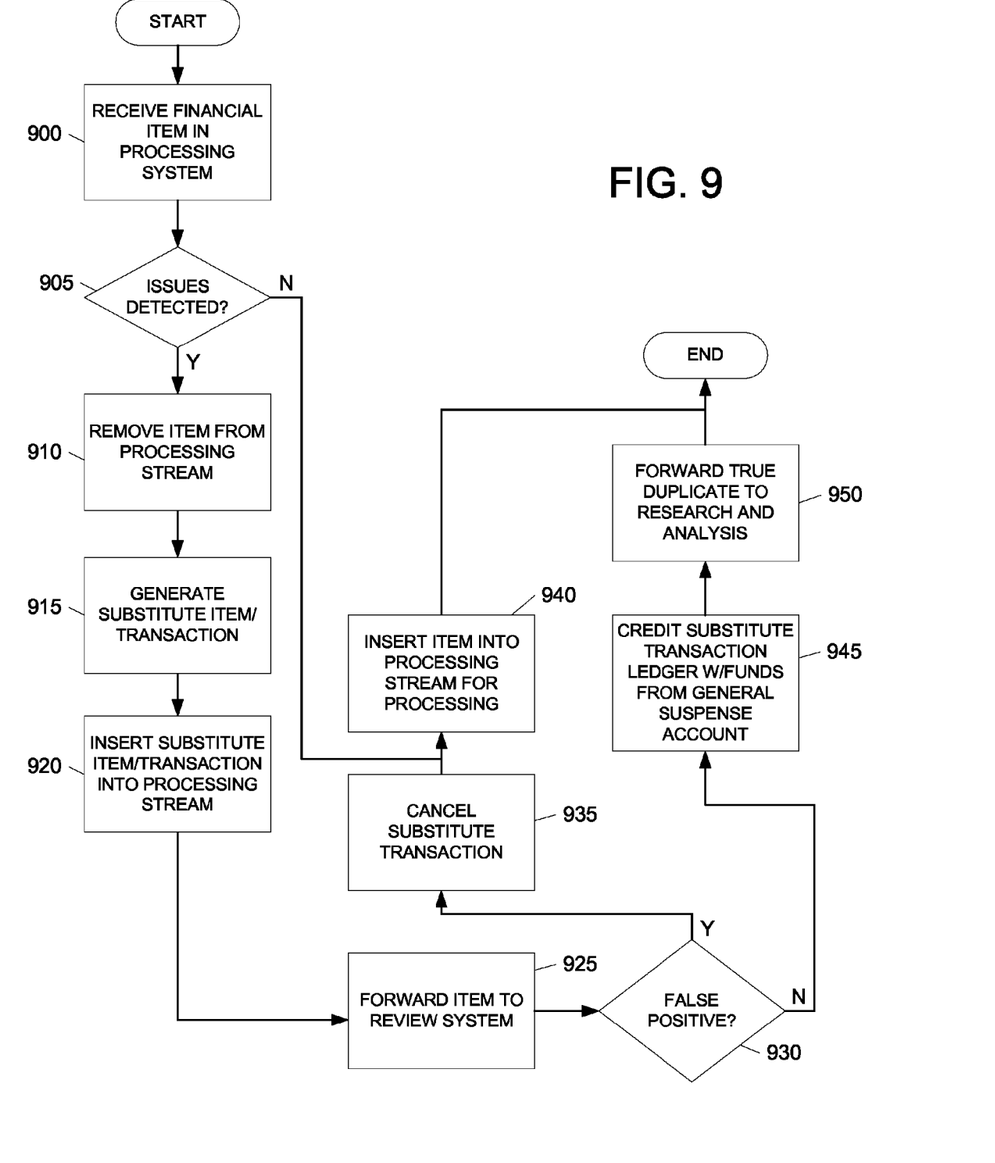
FIG. 9 illustrates an example method for detecting potential offending items based on specified criteria and processing the potential offending items according to one or more aspects described herein.

FIG. 9 illustrates an example method whereby a document processing issue is detected and a replacement document or transaction is inserted into the processing stream. In step 900, for example, a document or other item may be received by a financial processing system. The processing system may determine whether one or more offending issues are detected in the document in step 905. The detection may include the comparison of document or item attributes with one or more specified criteria that are considered offending issues to a processing system. For example, poor image quality may be detected based on a confidence level with which the numbers or other characters on an item were determined. In another example, an account number listed on an item may be compared with known account numbers and account number formats to determine whether the account number is incorrect.

If an issue is detected in step 905, the financial processing system may remove the item from the processing stream in step 910, generate a substitute transaction in step 915 and insert the substitute transaction in place of the removed item in step 920. As described herein, a substitute transaction may be equal in value to the removed item and may be charged against a work-in-process ledger. The removed item may then be transmitted to a review system in step 925 where the item may be further analyzed and evaluated. The analysis may include determining whether the item is a false positive of the issue identified or if the issue identified truly exists in the item (i.e., is a true offending item). In step 930, the processing system may determine whether the item is a false positive based on the analysis in step 925. If so, the item may be reinserted into the processing stream and the substitute transaction canceled in steps 940 and 935, respectively. If, however, it is determined that the item is a true offending item, the item may be forward to a research and analysis center for resolution in step 945. Additionally, the substitute transaction on the work-in-progress ledger may be converted into a charge against a general ledger suspense account in step 950. The transaction on the general ledger suspense account may be subsequently charged back to the depositing customer and/or written off by the financial institution.

The methods and features recited herein may further be implemented through any number of computer readable media that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (ICs). An integrated circuit may, for example, be a microprocessor that accesses programming instructions or other data stored in a read only memory (ROM). In some such embodiments, the ROM stores programming instructions that cause the IC to perform operations according to one or more of the methods described herein. In at least some other embodiments, one or more the methods described herein are hardwired into an IC. In other words, the IC is in such cases an application specific integrated circuit (ASIC) having gates and other logic dedicated to the calculations and other operations described herein. In still other embodiments, the IC may perform some operations based on execution of programming instructions read from ROM or RAM, with other operations hardwired into gates and other logic of IC. Further, the IC may output image data to a display buffer.

While illustrative systems and methods as described herein embodying various aspects of the present invention are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A method for processing financial transactions, the method comprising:
   receiving, by a processing system having at least one processor, data identifying a first financial document in a processing stream;
   determining, by the processing system, that the first financial document is a duplicate item of a second financial document based on a predefined set of one or more duplicate detection rules; and
   in response to determining that the first financial document is a duplicate item as defined by the one or more duplicate detection rules:
      removing, by the processing system, the first financial document from the processing stream,
      generating a substitute financial transaction including adding a charge on a first balance ledger,
      inserting, by the processing system, a substitute document specifying the substitute financial transaction into the processing stream to replace the removed first financial document, wherein a financial transaction of the removed first financial document corresponds to a charge on a second balance ledger different from the first balance ledger, and wherein the substitute document is different from the removed first financial document, and
      transmitting, by the processing system, the first financial document to a duplicate detection system for further evaluation.

2. The method of claim 1, wherein transmitting the first financial document to the duplicate detection system includes submitting the first financial document for manual review to confirm if the first financial document is a true duplicate of the second financial document.

3. The method of claim 1, wherein generating the substitute financial transaction includes generating a transaction involving funds from a work-in-progress ledger of a financial institution at which the first financial document is being processed.

4. The method of claim 3, further comprising:
   determining, by the processing system, that the first financial document is a false positive duplicate item; and
   in response to determining that the first financial document is a false positive duplicate item:
      cancelling, by the processing system, the substitute financial transaction, and
      reinserting, by the processing system, the first financial document into the processing stream.

5. The method of claim 3, wherein generating the substitute transaction further comprises including a credit to a payee of the first financial document with a value of the first financial document using the funds from the work-in-progress ledger.

6. The method of claim 3, further comprising:
   determining, by the processing system, that the suspected duplicate item first financial document is a true duplicate item; and
   in response to determining that the first financial document is a true duplicate item:
      generating, by the processing system, a transaction using funds from a general suspense account of the financial institution;
      replacing, by the processing system, the work-in-progress ledger transaction with the general suspense account transaction; and
      removing, by the processing system the work-in-progress ledger transaction.

7. The method of claim 6, wherein replacing the work-in-progress ledger transaction includes crediting the work-in-progress ledger with the funds from the general suspense account.

8. One or more non-transitory computer readable media storing computer readable instructions that, when executed, cause an apparatus to:
   receive data identifying a first financial document in a processing stream;
   determine whether the first financial document is a duplicate item of a second financial document based on a predefined set of one or more duplicate detection rules; and
   in response to determining that the first financial document is a duplicate item as defined by the one or more duplicate detection rules:
      remove the first financial document from the processing stream,
      generate a substitute financial transaction including adding a charge on a first balance ledger,
      insert a substitute document specifying the substitute financial transaction into the processing stream to replace the removed first financial document, wherein a financial transaction of the removed first financial document corresponds to a charge on a second balance ledger different from the first balance ledger, and wherein the substitute document is different from the removed first financial document, and
   transmit the first financial document to a duplicate detection system for further evaluation.

9. The one or more computer readable media of claim 8, further wherein generating the substitute financial transaction includes generating a transaction involving funds from a work-in-progress ledger of a financial institution at which the first financial document is being processed.

10. The one or more computer readable media of claim 9, wherein the computer readable instructions, when executed, further cause the apparatus to:
    determine whether the first financial document is a false positive duplicate item; and
    in response to determining that the first financial document is a false positive duplicate item:
       cancel the substitute financial transaction, and
       reinsert the first financial document into the processing stream.

11. The one or more computer readable media of claim 9, wherein generating the substitute financial transaction further comprises including a credit to a payee of the first financial document with a value of the first financial document using the funds from the work-in-progress ledger.

12. The one or more computer readable media of claim 9, wherein the computer readable instructions, when executed, further cause the apparatus to:
    determine whether the first financial document is a true duplicate item; and
    in response to determining that the first financial document is a true duplicate item:
       generate a transaction using funds from a general suspense account of the financial institution;
       replace the work-in-progress ledger transaction with the general suspense account transaction; and
       remove the work-in-progress ledger transaction.

13. The one or more computer readable media of claim 12, wherein replacing the work-in-progress ledger transaction includes crediting the work-in-progress ledger with the funds from the general suspense account.

14. The one or more computer readable media of claim 12, wherein determining whether the first financial document is a true duplicate item includes receiving a manual analysis of the first financial document.

15. An apparatus comprising:
at least one processor; and
memory operatively coupled to the at least one processor and storing computer readable instructions that, when executed by the at least one processor, cause the apparatus to:
receive data identifying a first financial document in a processing stream;
determine whether the first financial document is a duplicate item of a second financial document based on a predefined set of one or more duplicate detection rules; and
in response to determining that the first financial document is a duplicate item as defined by the one or more duplicate detection rules:
remove the first financial document from the processing stream,
generate a substitute financial transaction including adding a charge on a first balance ledger,
insert a substitute document specifying the substitute financial transaction into the processing stream to replace the removed first financial document, wherein a financial transaction of the removed first financial document corresponds to a charge on a second balance ledger different from the first balance ledger, and wherein the substitute document is different from the removed first financial document, and
transmit the first financial document to a duplicate detection system for further evaluation.

16. The apparatus of claim 15, further comprising a financial processing system configured to process financial transaction including payments.

17. The apparatus of claim 15, wherein the data identifying the first financial document is received from a remote capture site.

18. The apparatus of claim 15, wherein removing the first financial document from the processing stream includes removing the data identifying the first financial document.

19. The apparatus of claim 15, wherein the substitute transaction includes a transaction involving funds from a work-in-progress ledger of a financial institution at which the first financial document is being processed and wherein the computer readable instructions, when executed, further cause the apparatus to:
determine whether the suspected duplicate item is a false positive duplicate item; and
in response to determining that the suspected duplicate item is a false positive duplicate item:
cancel the substitute transaction, and
reinsert the first financial document into the processing stream.

20. A method comprising:
receiving, by a processing system having at least one processor, a financial item in a processing stream;
determining, by the processing system, whether the financial item is an offending item based on a criterion;
in response to determining that the first financial document is an offending item as defined by the criterion:
removing, by the processing system, the financial item from the processing stream,
generating, by the processing system, a substitute financial transaction including adding a charge on a first balance ledger, and
inserting, by the processing system, a substitute document specifying the substitute financial transaction into the processing stream to replace the removed financial item, wherein a financial transaction of the removed financial item corresponds to a charge on a second balance ledger different from the first balance ledger, and wherein the substitute document is different from the removed first financial item.

21. The method of claim 20, determining whether the financial item is an offending item based on the criterion includes determining whether an account number included in the financial item is a valid account number.

22. The method of claim 20, determining whether the financial item is an offending item based on the criterion includes determining whether a confidence level with which one or more attributes of the financial item was determined is above a specified threshold.

23. The method of claim 20, wherein generating the substitute financial transaction includes generating a transaction using funds from a work-in-progress ledger of a financial institution at which the financial item is being processed.

24. The method of claim 23, further comprising:
determining whether the offending item is a false positive item; and
in response to determining that the offending item is a false positive item:
cancelling the substitute transaction, and
reinserting the financial item into the processing stream.

* * * * *